United States Patent [19]

Zückert et al.

[11] 4,179,428

[45] Dec. 18, 1979

[54] PROCESS FOR PRODUCING WATER-EMULSIFIABLE PAINT BINDERS FOR STOVING PAINTS

[75] Inventors: Bertram Zückert; Wolfgang Schmut; Klaus Behmel, all of Graz, Austria

[73] Assignee: Vianova Kunstharz, A.G., Vienna, Austria

[21] Appl. No.: 798,492

[22] Filed: May 19, 1977

[30] Foreign Application Priority Data

May 21, 1976 [AT] Austria .................... 3748/76

[51] Int. Cl.$^2$ .................... C08L 61/28; C08L 67/08; C09D 3/66
[52] U.S. Cl. .................... 260/29.4 R; 260/21; 525/157; 525/163
[58] Field of Search .................... 260/21, 22 T, 22 M, 260/29.4 R, 850, 856; 106/243, 311

[56] References Cited

U.S. PATENT DOCUMENTS

| | | | |
|---|---|---|---|
| 3,133,032 | 5/1964 | Jen et al. ................... | 260/21 |
| 3,804,920 | 4/1974 | Cunningham et al. ........... | 260/850 |
| 3,959,201 | 5/1976 | Chang ....................... | 260/29.4 R |

FOREIGN PATENT DOCUMENTS 330315 6/1976 Austria .
330319 6/1976 Austria .

OTHER PUBLICATIONS

Derwent Publications Ltd., Abstract 60732W/37, 04/09/75, 1 page.

*Primary Examiner*—Theodore E. Pertilla
*Attorney, Agent, or Firm*—A. W. Breiner

[57] ABSTRACT

Process for producing water-emulsifiable paint binders based on select blends of alkyd resins and the improved emulsifiable paint binders therefrom are described. 30 to 75 percent by weight of aminoaldehyde resin is first reacted with 25 to 70 percent by weight of polyethylene glycols having an average molecular weight of from 500 to 3,000. Thereafter, 5 to 30 percent by weight of the polyethylene glycol modified aminoaldehyde resin is reacted with a blend of alkyd resins, one of the alkyd resins of the blend having a low acid number and another of the alkyd resins of the blend having a high acid number. The co-condensate of modified aminoaldehyde resin and alkyd resins when emulsified in water provides an emulsion with fine particles and excellent stability, rendering the emulsion particularly suitable for use in stoving paints.

4 Claims, No Drawings

PROCESS FOR PRODUCING WATER-EMULSIFIABLE PAINT BINDERS FOR STOVING PAINTS

The present invention is directed to water-emulsifiable paint binders. More particularly, the invention is directed to water emulsifiable paint binders having an alkyd resin base reacted with modified aminoaldehyde resins.

Austrian Patent specifications Nos. 330,315 and 330,319 describe a process for producing water-emulsifiable paint binders whereby alkyd resins or epoxy ester resins are rendered water-dilutable through reaction with methoxy polyethylene glycol modified amine aldehyde resins. However, certain disadvantages are encountered in the preparation and processing of such binders. For example, in many cases reproducibility of a binder with the characteristics desired is unsatisfactory owing to the fact that during reaction of the alkyd resin component with the polyethylene glycol modified amine aldehyde resin the water dilutability will pass through a pronounced maximum, falling off rapidly thereafter. Since the range of the maximum is very narrow, it is difficult to obtain emulsions with optimum stability. Furthermore, the water resistance of the resultant paints is deficient for many industrial applications.

It has now been found that the desired properties of water-dilutable alkyd emulsions can be substantially improved by using a select blend of alkyd resins. The major part of the blend will be an alkyd resin with a low acid number and the minor part of the blend will be an alkyd resin with a high acid number. Accordingly, favorable preliminary conditions are provided for the carboxy groups to orientate at the outside of the resin droplets which means that at equal level of acid number, the number of "effective" carboxy groups is higher, resulting in improved stability of the emulsion. Furthermore, bonding to a substrate of the resultant paint film made from a paint using the binder, and thus water resistance, is enhanced.

The present invention is, therefore, primarily directed to an improved process for producing water-emulsifiable paint binders based on oil-free and/or oil-modified alkyd resins, characterized in that in a first reaction step (A)

30–75% by weight of an aminoaldehyde resin, partly or totally etherified with monoalcohols with about 1 to 4 C-atoms, is reacted at from about 70° to 200° C. with 25–70% by weight, in relation to the aminoaldehyde resin, of polyethylene glycols with an average molecular weight of from about 500 to 3,000, optionally coemploying subordinate quantities of monomethoxypolyethylene glycols with an average molecular weight of 400 to 1,000 and/or up to 10% of a hydroxy carboxylic acid, until an intrinsic viscosity of from about 5 to 15 ml/g in chloroform at 20° C. is obtained; and in a second reaction step (B)

5–30% by weight of the reaction product of first reaction step (A) are co-condensed at from about 50° to 150° C. to an intrinsic viscosity of between from about 6 and 12 ml/g in chloroform at 20° C. without surpassing the emulsifiable state with 50–85% by weight, in relation to the reaction product of step (A) of an oil-free and/or oil-modified alkyd resin with an acid number of below 5 mg KOH/g and an intrinsic viscosity of from about 4 to 8 ml/g in chloroform at 20° C., and 10–25% by weight, in relation to the reaction product of step (A) of an oil-free and/or oil-modified alkyd resin with an acid value of between from about 80 and 140 mg KOH/g and an intrinsic viscosity of from about 4 to 10 ml/g in dimethylformamide at 20° C., and emulsifying the co-condensate at from about 30° to 80° C., preferably 40° to 60° C., in water and to the improved emulsions obtained by the improved process.

The emulsions produced by the process are fine particle emulsions with outstanding stability particularly suitable for stoving paints.

Suitable aminoformaldehyde resins for use in accordance with this invention are those known in the art as partly or totally etherified condensation products of aminotriazines, including melamine, benzoguanamine or urea with aldehydes, preferably formaldehyde.

Suitable polyethylene glycols for use in modifying the aminoformaldehyde resin are products with a molecular weight of from 500 to 3,000. Subordinate quantities of monomethoxypolyethylene glycols with a molecular weight of from 400 to 1,000 can be coemployed. Furthermore, for further enhancing the stability of the emulsion, film adhesion, and water resistance, the amineformaldehyde resins can also be modified with hydroxy carboxylic acids. Acids particularly suitable are lactic acid, glycollic acid, dimethylol propionic acid, malic acid, tartaric acid, and salicylic acid.

When aminoformaldehyde resins modified as above described are reacted with select blends of alkyd resins, as more particularly defined hereinafter, water dilutability is excellent within a wide range, enabling emulsions with optimum stability and excellent reproducibility to be prepared.

Alkyd resins suitable for the manufacture of the emulsions of the present invention are based on raw materials and made by production methods known in the art, and more particularly are the alkyds normally used in stoving binders including oil-free polyester resins or alkyd resins with a fatty acid content of up to 50 percent. A blend of the two alkyd resins present in the final emulsion prior to co-condensation with the modified aminoformaldehyde resin preferably will have characteristics as follows:

| | |
|---|---|
| hydroxyl number: | from about 100–300 mg KOH/g |
| acid number: | from about 10–40 mg KOH/g |
| blending ratio: | from about 75–90% by weight alkyd resin with acid number below 5 mg KOH/g from about 10–25% by weight alkyd resin with acid number between 80 to 140 mg KOH/g. |

According to the process of the invention, the aminoformaldehyde resin is first reacted with the polyethylene glycol at a temperature of from about 70°–200° C., optionally applying a slight vacuum and optionally coemploying monomethoxypolyethylene glycol and/or hydroxy carboxylic acids as noted hereinbefore. During the course of the reaction the polyethylene glycol and the hydroxy carboxylic acids are linked to the aminoformaldehyde resin with ether linkages. The alcohol set free through re-etherification and the water set free through etherification are distilled off. The reaction can be catalyzed through addition of inorganic or organic acids such as $H_3PO_4$, p-toluol sulfonic acid, and oxalic acid. The optimum degree of condensation is obtained by determining changes during the course of the reaction. The reaction is interrupted at an intrinsic viscosity of from about 5 to 15 ml/g in chloroform at 20° C. according to the results of tests. Then the modified aminoformaldehyde resin is co-condensed with the alkyd resin blend at from about 50° to 150° C. For some combinations of components it can be advantageous to carry out the co-condensation in several steps, with variation being possible among the three components.

During the course of the reaction between the alkyd resin and modified aminoformaldehyde resin, water dilutability improves at continuously rising intrinsic viscosity; then over a range of about 1–2 units of intrinsic viscosity, water dilutability remains substantially constant, before again falling off. At the same time, the concentration for the inversion point from w/o to o/w changes and with it the dilution characteristics of the emulsion. It is essential, therefore, to carefully control the reaction and to interrupt it at the correct moment. In order to help control the rate of reaction, up to 20 percent by weight of an organic solvent such as butanol, ethyleneglycol monoethylether, or ethyleneglycol monoethylether acetate can be added. Additional control can be obtained, if desired, by "pre-neutralizing" the carboxy-groups of the alkyd resin with an organic amine since the carboxy groups can exert a catalytic effect on the reaction. The pre-neutralizing will retard the reaction enabling greater control. Through using such measures, slightly etherified, highly reactive aminoformaldehyde resins can be employed.

The course of the reaction is monitored by measuring the intrinsic viscosity and checking transparency or opalescence of samples diluted with water. The preferred range of intrinsic viscosity for the co-condensates is from about 6 to 12 ml/g in chloroform at 20° C.

At the end of reaction, the co-condensate is emulsified in water at from about 30° to 80° C., and preferably from about 40° to 60° C. Emulsification can be carried out in normal alkyd resin reactors. Emulsification is more rapid and homogeneous when carried out with high speed stirrers, e.g., dissolvers. To stabilize the dispersion, unless "preneutralized," the pH is adjusted with ammonia or organic amines to a value of from about 5.5 to 7.5, whereby more than about 50 percent of the carboxy groups present are neutralized.

In a special mode of procedure, a part or the total of the acid alkyd resin component is added to the co-condensate in the form of its water-soluble ammonium or amine salt at emulsification.

Processing of the paint binders of the invention is carried out in accordance with known principles for manufacturing water-dilutable stoving paints. The binders are combined with crosslinking components, such as water-soluble melamine resins, benzoguanamine resins, urea resins, phenolic resins; and are optionally ground with pigments, dyes, and extenders. They are applied in normal manner through spraying, dipping, or flow coating. Crosslinking is effected to obtain film formation at temperatures above 100° C., the time of heating being sufficient to obtain a film having the desired degree of hardness.

The following examples illustrate the invention without limiting the scope of it. Parts are by weight unless otherwise indicated.

Modification of aminoformaldehyde resins with polyethylene glycol or hydroxycarboxylic acids (A1)

150 g of a highly reactive partially butylated melamine resin (60% in butanol, viscosity f.o.d. 200 s, DIN 53 211, containing per triazine ring an average of 2 butoxymethyl groups and 3.5 methylol groups) are held for 7 hours at a temperature of from 105°–110° C. while stirring with 45 g of polyethylene glycol (molecular weight 1500). A slight vacuum is applied. The butanol and water by-products of the reaction are distilled off. A paste is obtained with a solids content of about 76% and an intrinsic viscosity of 8.9 ml/g in chloroform at 20° C.

In place of the polyethylene glycol with a molecular weight of 1500 a polyglycol with a higher molecular weight can be used. With a polyethylene glycol with a molecular weight of 3000, for example, a semi-solid mass with an intrinsic viscosity of 13.1 ml/g is obtained which behaves analogous to product "A1."

(A2)

150 g hexamethoxymethylmelamine, 150 g polyethylene glycol (molecular weight 1500), and 0.1 g oxalic acid are heated for 6 hours at a temperature of 110°–120° C. with slight distillation occurring. The oxalic acid is thereafter precipitated with an equivalent quantity of calciumoctoate. A pasty mass is obtained with an intrinsic viscosity of 12.8 ml/g in chloroform at 20° C.

If the polyethylene glycol is replaced by a polyglycol with a molecular weight of about 1,000, a comparable product with an intrinsic viscosity of 10.7 ml/g in chloroform at 20° C. results.

(A3)

143 g of a benzoguanamine resin partially etherified with butanol (70% in butanol, containing per triazine ring an average of 1.5 butoxymethyl groups and 1.5 methylol groups), 50 g polyethylene glycol (molecular weight 1500), and 3.5 g of 57% aqueous glycollic acid solution are heated at a temperature of 120° to 125° C. for 6½ hours with slight distillation occurring. A pasty mass forms with a solids content of 90%, an intrinsic viscosity of 10.6 ml/g in chloroform at 20° C., and an acid number of 6.4 mg KOH/g.

In this example the glycollic acid can be replaced by other hydroxy carboxylic acids. With an equivalent quantity of dimethylolpropionic acid, a paste is obtained with an intrinsic viscosity of about 11.5 ml/g in chloroform at 20° C. with comparable properties.

(A4)

140 g of a water-dilutable highly reactive urea resin (71.5% ethanol solution, with an average of 0.4 ethoxymethyl groups and 1.4 methylol groups in the molecule) and 100 g polyethylene glycol (molecular weight 1500) are held at 95° to 100° C. for 3½ hours with slight distillation. A clear solution forms with a solids content of 85.5% and an intrinsic viscosity of 6.3 ml/g in dimethylformamide at 20° C.

(A5)

150 g hexamethoxymethylmelamine, 140 g polyethylene glycol (molecular weight 1500), 10 g monomethoxypolyethylene glycol (molecular weight 500), and 0.1 g oxalic acid are stirred at a temperature of from 110°–120° C. for 6 hours with slight distillation occurring. After reaction the oxalic acid is precipitated with an equivalent amount of calcium octoate. The obtained pasty product has an intrinsic viscosity of 12.6 ml/g in chloroform at 20° C.

Alkyd Resin Components (B1)

A blend of two dehydrated castor oil alkyds is prepared consisting of 80 parts of an alkyd resin (a) with an acid number of below 3 mg KOH/g, and of 20 parts of an alkyd resin (b) with an acid number of 100–110 mg KOH/g.

Alkyd Resin (a): 125 g dehydrated castor oil fatty acid, 80 g pentaerythritol, 30 g trimethylol propane, 80 g phthalic anhydride, and 20 g adipic acid are esterified at 200° C. to an acid value of 2.3 mg KOH/g and an intrinsic viscosity of 5.6 ml/g in trichloroethylene at 20° C. The resin is diluted to a solids content of 91.2% with monoethyleneglycol monobutylether. The product has a hydroxyl number of 210 mg KOH/g.

Alkyd Resin (b): 280 g dehydrated castor oil fatty acid and 270 g trimethylolpropane are esterified at 200° C. until an acid value of below 2 mg KOH/g is reached. Thereafter, 220 g trimellitic anhydride are added and the mixture heated to a temperature of 150° to 160° C. and held at this temperature until an acid value of 108 mg KOH/g and an intrinsic viscosity of 6.4 ml/g in dimethylformamide at 20° C. is attained. The resin is diluted to a solids content of 85% with diethylene glycolmonoethyl ether. The hydroxyl value is 226 mg KOH/g.

Resins (a) and (b) are mixed in a ratio of 4:1 such that the blend has an acid value of 23.4 mg KOH/g and a solids content of 90.1%.

(B2)

A blend of two alkyd resins based on saturated fatty acids is prepared consisting of 85 parts of alkyd resin (a) with an acid number of below 5 mg KOH/g and 15 parts of alkyd resin (b) with an acid value of 80–100 mg KOH/g.

Alkyd Resin (a): 60 g of a straight chain saturated fatty acid with an average molecular weight of 135, 85 g trimethylol propane, 40 g pentaerythritol, 100 g phthalic anhydride, and 30 g adipic acid are esterified to an acid value of 4.8 mg KOH/g. The resin is diluted to a solids content of 89% with diethylene glycol monoethyl ether. The intrinsic viscosity is 5.8 ml/g in trichloroethylene at 20° C., and the hydroxyl number is 208 mg KOH/g.

Alkyd Resin (b): 85 g of a saturated straight chain fatty acid with an average molecular weight of 135, 125 g trimethylolpropane, and 20 g adipic acid are esterified to an acid value of below 5 mg KOH/g. Thereafter, 87 g trimellitic anhydride are added, the mixture heated to 160° C., and held until an acid value of 92 mg KOH/g is attained. The resin is diluted with diethylene glycol monoethyl ether to a solids content of 84%. The intrinsic viscosity is 5.8 ml/g in dimethylformamide at 20° C. The hydroxyl number is 195 mg KOH/g.

Resins (a) and (b) are mixed in a ratio of 85:15 to provide an acid number of 17.9 mg KOH/g and a solids content of 88.2%.

(B3)

A 75:25 blend of alkyd resins B2(a) and B2 (b) is prepared. The acid value of the blend is 26.6 mg KOH/g, and the solids content 87.7%.

(B4)

A blend of oil-free polyesters consisting of 75 parts of a weakly acidic component (a) and 25 parts of a strongly acidic component (b).

Alkyd Resin (a): 55 g neopentylglycol, 65 g trimethylol propane, 108 g phthalic anhydride, and 30 g adipic acid are esterified to an acid value of 4.5 mg KOH/g. The resin is diluted to 89% with diethylene glycol monoethyl ether and has an intrinsic viscosity of 5.9 ml/g in chloroform at 20° C. The hydroxyl number is 238 mg KOH/g.

Alkyd Resin (b): 320 g neopentylglycol and 146 g adipic acid are esterified to an acid value below 5 mg KOH/g. Thereafter 192 g trimellitic anhydride are added, the mixture heated to 150° to 160° C. and held until an acid value of 110 mg KOH/g is attained. The resin is diluted to 85% with diethylene glycolmonoethylether. The intrinsic viscosity is 4.6 ml/g in dimethylformamide at 20° C. The hydroxyl number is 195 mg KOH/g.

Resins (a) and (b) are mixed in a ratio of 75:25. A resin is obtained with an acid value of 30.9 mg KOH/g and a solids content of 88.2%.

EXAMPLES 1 To 6

Table 1 gives composition, reaction conditions, and specification of the co-condensates and emulsions of the present invention. Parts are by weight if not otherwise stated and reference is to the resin solids of the intermediate product.

The emulsions are prepared as follows:

Co-Condensation of Resins A and B

The blend of alkyd resins B(a) and B(b) is neutralized with the given quantity of triethylamine. The modified amine formaldehyde resin A is admixed and the mass is heated to reaction temperature. The reaction is monitored by measuring the intrinsic viscosity and dilutability with water. A 30% aqueous emulsion with sufficient reaction is transparent when in a thin layer and shows pronounced fluorescence when poured out on a glass plate. The reaction is interrupted when the desired intrinsic viscosity is attained and water dilutability does not improve further.

Emulsification of Co-Condensate

The co-condensate is emulsified in a dissolver with deionized water, using rapid stirring, at a temperature of from 40° to 60° C.

TABLE 1

| Example | | C 1 | C 2 | C 3 | C 4 | C 5 | C 6 |
|---|---|---|---|---|---|---|---|
| Alkyd resin | B 1 | 80 | — | — | — | — | — |
| | B 2 | — | 85 | — | — | — | 80 |
| | B 3 | — | — | 90 | — | — | — |
| | B 4 | — | — | — | 78 | 75 | — |
| Modified amine resin | A 1 | — | — | — | 22 | — | — |
| | A 2 | — | 15 | 10 | — | — | — |
| | A 3 | 20 | — | — | — | — | — |
| | A 4 | — | — | — | — | 25 | — |
| | A 5 | — | — | — | — | — | 20 |
| % neutralization of the carboxy groups with triethylamine reaction | | 85 | 80 | 90 | 90 | 90 | 85 |

TABLE 1-continued

| Example | C 1 | C 2 | C 3 | C 4 | C 5 | C 6 |
|---|---|---|---|---|---|---|
| temperature (° C.) | 90-100 | 90 | 90 | 80 | 90 | 90 |
| co-condensate: | | | | | | |
| intrinsic viscosity ml/g | | | | | | |
| in chloroform 20° C. | 9.5 | 9.45 | 9.4 | 7.7 | 7.3 | 9.6 |
| solids content (%) | 89.8 | 89.7 | 88.8 | 85.5 | 87.5 | 90.5 |
| emulsion: | | | | | | |
| solids content | 45 | 55 | 52 | 50 | 50 | 48 |
| pH | 6.6 | 6.8 | 6.9 | 6.7 | 6.8 | 6.7 |

Evaluation

The emulsion binders of Examples 1 to 6 were formulated into white baking enamels as shown in Table 2 and evaluated, again as set forth in Table 2. The paints are diluted to application viscosity with deionized water.

TABLE 2

| Example | C 1 | C 2 | C 3 | C 4 | C 5 | C 6 |
|---|---|---|---|---|---|---|
| Co-condensate (resin solids) | 75 | 70 | 75 | 80 | 80 | 80 |
| Titanium dioxide (Rutile type) | 80 | 80 | 100 | 80 | 100 | 80 |
| Flow agent (1) | 0.1 | 0.1 | 0.2 | 0.1 | 0.2 | 0.1 |
| Crosslinker X (2) | 25 | 30 | 25 | — | — | 20 |
| Crosslinker Y (3) | — | — | — | 20 | 20 | — |
| Stoving time (minutes) | | | | | | |
| Temperature (° C.) | 30/130 | 30/130 | 30/140 | 30/150 | 30/150 | 30/140 |
| dry film thickness μm | 38 | 40 | 36 | 35 | 38 | 41 |
| gloss (Lange, 45°) % | 112 | 109 | 103 | 106 | 109 | 115 |
| König hardness DIN 53 157/5 | 115 | 121 | 126 | 141 | 136 | 122 |
| Erichsen indentation (DIN 53 156/mm) | 7.6 | 7.1 | 7.3 | 5.8 | 6.1 | 6.9 |
| water soak 48 hours, at 40° C. (Blistering DIN 53 209) | ← | ← | mO/gO | → | → | → |

Key to Table 2
(1) Available flow agent based on silicone
(2) Crosslinker X: commercial melamine resin of medium reactivity, 80% in isopropanol, average content of 2 methoxy methyl groups, 2 ethoxymethyl groups, 1.5 methylol groups.
(3) Crosslinker Y: commercial solvent free hexamethoxymethyl melamine with a degree of etherification of more than 95%.
mO/gO indicates no adverse effects.

EXAMPLE 7

64 g of component B1 (a) and 8 g of component B1 (b) are mixed and about 80% of the carboxy groups are neutralized with triethylamine. After addition of 20 g of the modified aminoformaldehyde resin A3 the batch is heated to 95° C., while stirring, and held until an intrinsic viscosity of 9.45 ml/g in chloroform at 20° C. is attained. For emulsifying the co-condensate 8 g of component B1 (b) neutralized fully with triethylamine and dissolved in 100 g of deionized water are used.

The solids content of the emulsion is 50% by weight, the pH value is 6.8. The emulsion is extremely stable and shows the same overall properties as the emulsion of Example C 1.

In the above examples various modifications can be made particularly in substitution of materials in both the preparation of the modified aminoformaldehyde resin and in the alkyd resins. These modifications will be apparent to one skilled in the art.

We claim:

1. A water-emulsifiable paint binder which includes the water emulsion of the co-condensation product of from
   (1) 5–30% by weight of a reaction product (A),
   (2) 50–85% by weight, in relation to said reaction product (A), of an alkyd resin with an acid number of below 5 mg KOH/g and an intrinsic viscosity of from about 4 to 8 ml/g in chloroform at 20° C., and
   (3) 10–25% by weight, in relation to said reaction product (A), of an alkyd resin with an acid value of between from about 80 and 140 mg KOH/g and an intrinsic viscosity of from about 4 to 10 ml/g in dimethylformamide at 20° C., said co-condensation product having been produced by carrying out the reaction of (1), (2), and (3) at a temperature of from about 50° to 150° C. to an intrinsic viscosity of between from about 6 and 12 ml/g in chloroform at 20° C. without surpassing the emulsifiable state; said reaction product (A) being the reaction product obtained by reacting at a temperature of from about 70° to 200° C. from about
   (1) 30–75% by weight of an aminoaldehyde resin at least partly etherified with monoalcohols with from about 1 to 4 C-atoms, and
   (2) 25–70% by weight, in relation to said aminoaldehyde resin, of polyethylene glycols with an average molecular weight of from about 500 to 3000 and having an intrinsic viscosity of from about 5 to 15 ml/g in chloroform at 20° C.

2. The binder of claim 1 wherein the co-condensation product is from (1) 5–30% by weight of reaction product (A); (2) 75–85% by weight of an alkyd resin with a low acid number, and (3) 15 to 25% of an alkyd resin with a high acid number, within the ranges stated.

3. The binder of claim 1 wherein the aminoaldehyde resin of (A) is totally etherified with monoalcohols.

4. The binder of claim 1 wherein the carboxy groups of components (2) and (3) of the co-condensation product, prior to co-condensation, are neutralized with organic amines.

* * * * *